United States Patent
Wang et al.

(10) Patent No.: US 11,963,255 B2
(45) Date of Patent: Apr. 16, 2024

(54) METHOD AND APPARATUS FOR DETERMINING EDRX CONFIGURATION PARAMETERS, AND TERMINAL

(71) Applicant: GUANGDONG OPPO MOBILE TELECOMMUNICATIONS CORP., LTD., Guangdong (CN)

(72) Inventors: Shukun Wang, Guangdong (CN); Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 351 days.

(21) Appl. No.: 17/344,701

(22) Filed: Jun. 10, 2021

(65) Prior Publication Data

US 2021/0360734 A1 Nov. 18, 2021

Related U.S. Application Data

(63) Continuation of application No. PCT/CN2018/121308, filed on Dec. 14, 2018.

(51) Int. Cl.
*H04W 76/28* (2018.01)

(52) U.S. Cl.
CPC ................... *H04W 76/28* (2018.02)

(58) Field of Classification Search
CPC .................................................. H04W 76/28
See application file for complete search history.

(56) References Cited

U.S. PATENT DOCUMENTS

| 10,863,394 | B2* | 12/2020 | Kim | H04W 76/28 |
| 11,089,570 | B2* | 8/2021 | Yi | H04L 5/0055 |
| 2017/0311290 | A1* | 10/2017 | Adjakple | H04W 76/18 |
| 2018/0234894 | A1 | 8/2018 | Jiang | |
| 2018/0338281 | A1* | 11/2018 | Bangolae | H04W 68/02 |

(Continued)

FOREIGN PATENT DOCUMENTS

| CN | 106658758 A | 5/2017 |
| CN | 107534937 A | 1/2018 |
| CN | 108617033 A | 10/2018 |

OTHER PUBLICATIONS

SA WG2 Meeting #S2-129, S2-1810771 Oct. 15-19, 2018, Dongguan, China Source: InterDigital Inc. Title: Update and conclusion on solution 38: eDRX in RRC inactive (Year: 2018).*

(Continued)

*Primary Examiner* — Chi H Pham
*Assistant Examiner* — Weibin Huang
(74) *Attorney, Agent, or Firm* — Ladas & Parry LLP

(57) ABSTRACT

Provided in the embodiments of the disclosure are a method and apparatus for determining a configuration parameter, and a terminal. The method includes that: a terminal determines, after entering from an inactive state to an idle state, to use a first extended Discontinuous Reception (eDRX) configuration parameter or a second eDRX configuration parameter to control a monitoring state of the terminal. The first eDRX configuration parameter is an eDRX configuration parameter corresponding to the inactive state, and the second eDRX configuration parameter is an eDRX configuration parameter corresponding to the idle state.

8 Claims, 10 Drawing Sheets

(56) References Cited

U.S. PATENT DOCUMENTS

2021/0351881 A1* 11/2021 Park .................... H04W 24/10

OTHER PUBLICATIONS

International Search Report in the international application No. PCT/CN2018/121308, dated Apr. 16, 2019.

Interdigital Inc: "Update and conclusion on solution 38: eDRX in RRC inactive", 3GPP Draft; S2-1810771_CIOT_Update and Conclusion on Solution 38, 3rd Generation Partnership Project (3GPP), Mobile Competence Centre , 650, Route Deslucioles ; F-06921 Sophia-Antipolis Cedex Franc.vol. SA WG2, No. Dongguan, China; 20181015201810199 Oct. 2018 (Oct. 9, 2018), XP051539720,Retrieved from the Internet: URL:http://www3gpp.org/ftp/tsg%5Fsa/WG2% 5FArch/TSGS2%5F129%.

"3rd Generation Partnership Project;Technical Specification Group Radio Access Network; Evolved Universal Terrestrial Radio Access (E-UTRA); Radio Resource Control (RRC); Protocol specification(Release 15)" 3GPP Draft: 36331-F30, 3rd Generation Partnership Project (3GPP), Mobile Competence Centre ; 650, Route Deslucioles ; F-06921 Sophia-Antipolis Cedex ; France1 Oct. 2018 (Oct. 1, 2018) ) XP051519475, Retrieved from the Internet: URL: http://www. 3gpp.org/ftp/tsg%5Fran/WG2 5FRL2/.

Anonymous: "3 Generation Partnership Project; Technical Specification Group Radio Access Network; Evolved Universal Terrestrial Radio Access (E-UTRA) ; User Equipment (UE) procedures in idle mode(Release 15)" 3GPP Standard; Technical Specification;3GPP TS 36.304, 3rd Generation Partnership Project (3GPP), Mobile Competence Centre650, Route Des Lucioles ; F-06921Sophia-Antipolis Cedex ; France No. V15.1.0,Sep. 30, 2018 (Sep. 30, 2018), pp. 1-55, XP051487410,paragraph [07.1]—paragraph [07.3.

"3rd Generation Partnership Project;Technical Specification Group Radio Access Network; NR; NR and NG-RAN Overall Description; Stage 2 (Release 15)", 3GPP Standard; Technical Specification;3GPP TS 38.300, 3rd Generation Partnership Project (3GPP), Mobile Competence Centre650, Route Des Lucioles ; F-06921Sophia-Antipolis Cedex ;Francevol. RAN WG2, No. V15.3.1,Oct. 7, 2018 (Oct. 7, 2018),pp. 1-92,XPO51487627,[retrieved on Oct. 7, 2018] paragraph [9.2.5].

Anonymous: "3rd Generation Partnership Project; Technical Specification Group Services and System Aspects; System Architecture for the 5G System; Stage2(Release 15)",3GPP Standard; Technical Specification,3GPP TS 23.501, 3rd Generation Partnership Project (3GPP), Mobile Competence Centre650, Route Des Lucioles ; F-06921Sophia-Antipolis Cedex ; France,No. V15.3.0,Sep. 17, 2018 (Sep. 17, 2018), pp. 1-226, XP05148701* paragraph [5.3.3.2.5].

Ericsson: "EDRX with RRC Inactive-solution update and evaluation",3GPP Draft; S2-188994_WAS8881_CIOT_EDRXWith RRC Inactive—Solution Update ANDEVALUATION_V4, 3rd Generation PartnershipProject (3GPP), Mobile Competence Centre650, Route Des Lucioles ; F-06921vol. SA WG2, No. Sophia Antipolis, France;Aug. 20, 2018-Aug. 24, 2018 Aug. 27, 2018 (Aug. 27, 2018), XP051503101, Retrieved from the Internet: URL:http:// www. 3gpp. org/ftp/tsg%5Fsa/WG2%5FArch/TSGS2% 5F128BIS5FSophia%5.

Supplementary European Search Report in the European application No. 18942975.6, dated Dec. 15, 2021.

English translation of the Written Opinion of the International Search Authority in the international application No. PCT/CN2018/ 121308, dated Apr. 16, 2019.

* cited by examiner

A terminal determines, after entering from an inactive state to an idle state, to use a first eDRX configuration parameter or a seond eDRX configuration parameter to control a monitoring state of the terminal, the first eDRX configuration parameter being an eDRX configuration parameter corresponding to the inactive state, and the second eDRX configuration parameter being an eDRX configuration parameter corresponding to the idle state
— 601

FIG. 6

METHOD AND APPARATUS FOR DETERMINING EDRX CONFIGURATION PARAMETERS, AND TERMINAL

CROSS-REFERENCE TO RELATED APPLICATION

This application is a continuation of International Patent Application No. PCT/CN2018/121308 filed on Dec. 14, 2018, the disclosure of which is incorporated herein by reference in its entirety.

BACKGROUND

In order to meet requirements of people on the rate, delay, high-speed mobility and energy efficiency of services as well as the diversity and complexity of the services in future life, the 3rd Generation partnership Project (3GPP) international standard organizations start to research and develop 5th Generation (5G) mobile communication technologies.

In 5G network environments, a novel Radio Resource Control (RRC) state, i.e., an RRC inactive (RRC_INACTIVE) state, is defined for reducing radio signaling, quickly resuming wireless connections and quickly restoring data services. Such a state is different from an RRC idle (RRC_IDLE) state and an RRC connected (RRC_CONNECTED) state.

In order to save the energy and power, an extended Discontinuous Reception (eDRX) configuration parameter may be configured for a terminal in the RRC_INACTIVE state. In addition, the terminal in the RRC_IDLE state may also use an eDRX configuration parameter. Moreover, the eDRX configuration parameter used in the RRC_IDLE state is different from that used in the RRC_INACTIVE state. When the terminal enters from the RRC_INACTIVE state to the RRC_IDLE state, how to use a DRX configuration parameter needs to be clarified.

SUMMARY

Embodiments of the disclosure relate to the technical field of mobile communications, and more particularly to a method and apparatus for determining a configuration parameter, and a terminal.

The method for determining a configuration parameter provided by the embodiments of the disclosure includes the following operation.

A terminal determines, after entering from an inactive state to an idle state, to use a first extended Discontinuous Reception (eDRX) configuration parameter or a second eDRX configuration parameter to control a monitoring state of the terminal.

The first eDRX configuration parameter is an eDRX configuration parameter corresponding to the inactive state, and the second eDRX configuration parameter is an eDRX configuration parameter corresponding to the idle state.

The apparatus for determining a configuration parameter provided by the embodiments of the disclosure includes: a switching unit and a determining unit.

The switching unit is configured to control a terminal to enter from an inactive state to an idle state.

The determining unit is configured to determine to use a first extended Discontinuous Reception (eDRX) configuration parameter or a second eDRX configuration parameter to control a monitoring state of the terminal.

The first eDRX configuration parameter is an eDRX configuration parameter corresponding to the inactive state, and the second eDRX configuration parameter is an eDRX configuration parameter corresponding to the idle state.

The terminal provided by the embodiments of the disclosure includes a processor and memory. The memory is configured to store a computer program, and the processor is configured to call and run the computer program stored in the memory to implement the above method for determining a configuration parameter.

A chip provided by the embodiments of the disclosure is configured to implement the above method for determining a configuration parameter.

Specifically, the chip may include: a processor, configured to call and run a computer program in memory to enable a device installed with the chip to implement the above method for determining a configuration parameter.

A computer-readable storage medium provided by the embodiments of the disclosure is configured to store a computer program, the computer program enabling a computer to implement the above method for determining a configuration parameter.

A computer program product provided by the embodiments of the disclosure may include computer program instructions, the computer program instructions enabling a computer to implement the above method for determining a configuration parameter.

A computer program provided by the embodiments of the disclosure runs in a computer to enable the computer to implement the above method for determining a configuration parameter.

With the above technical solutions, a eDRX configuration parameter to be used after the terminal enters from the inactive state to the idle state can be clarified. The power of a terminal can be saved and the latency of a service is not affected by flexibly controlling the terminal to use a eDRX configuration parameter.

BRIEF DESCRIPTION OF THE DRAWINGS

The accompanying drawings are described here to provide a further understanding of the disclosure and form a part of the disclosure. The schematic embodiments and description of the disclosure are adopted to explain the disclosure, and do not form improper limits to the disclosure. In the drawings:

FIG. 6 is a flowchart of a method for determining a configuration parameter according to an embodiment of the disclosure.

DETAILED DESCRIPTION

The technical solutions in the embodiments of the disclosure will be described below in combination with the drawings in the embodiments of the disclosure. It is apparent that the described embodiments are not all embodiments but a part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system or a 5G system.

Figure 1:
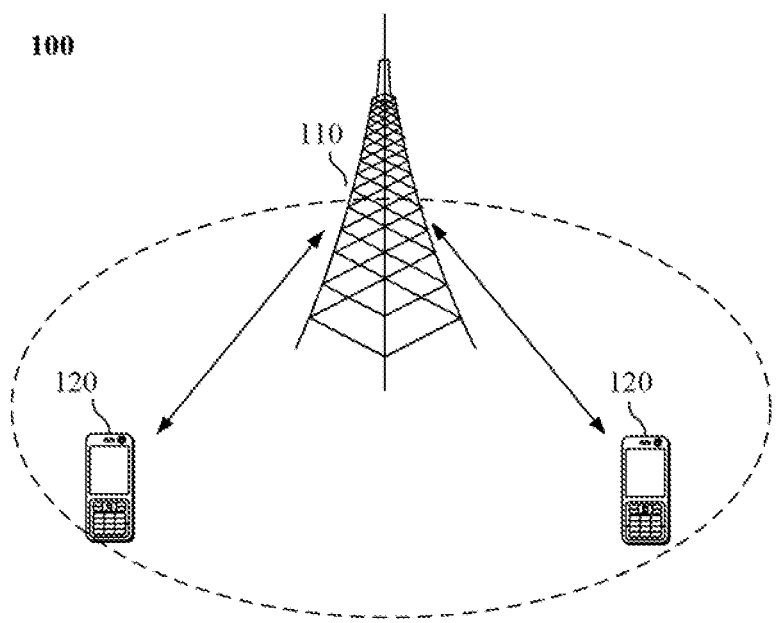
FIG. 1 is a schematic diagram of a communication system architecture according to an embodiment of the disclosure.

For example, the communication system 100 to which the embodiments of the disclosure are applied is as shown in FIG. 1. The communication system 100 may include a network device 110. The network device 110 may be a device communicating with a terminal 120 (or called a communication terminal or a terminal). The network device 110 may provide communication coverage for a specific geographical region and may communicate with the terminal under the coverage. In some examples, the network device 110 may be a Base Transceiver Station (BTS) in a GSM system or a CDMA system, may also be a NodeB (NB) in a WCDMA system, or may be an Evolutional Node B (eNB or eNodeB) in an LTE system or a wireless controller in a Cloud Radio Access Network (CRAN). Or the network device may be a mobile switching center, a relay station, an access point, a vehicle-mounted device, a wearable device, a concentrator, a switch, a network bridge, a router, a network-side device in a 5G network, a network device in a future evolved PLMN or the like.

The communication system 100 may also include at least one terminal 120 within the coverage of the network device 110. The "terminal" used herein includes, but not limited to, connection via a wired circuit, such as connection via Public Switched Telephone Networks (PSTN), a Digital Subscriber Line (DSL), a digital cable and a direct cable; and/or another data connection/network; and/or a wireless interface, for example, for a cellular network and a Wireless Local Area Network (WLAN) such as a digital television network of a Digital Video Broadcasting-Handheld (DVB-H) network, a satellite network and an Amplitude Modulation-Frequency Modulation (AM-FM) broadcast transmitter; and/or an apparatus of another terminal that is configured to receive/send a communication signal; and/or an Internet of Things (IoT) device. The terminal configured to communicate through the wireless interface may be called a "wireless communication terminal", a "wireless terminal" or a "mobile terminal". Examples of the mobile terminal include, but not limited to, a satellite or cell phone; a Personal Communication System (PCS) terminal that can combine a cellular radiotelephone, data processing, facsimile, and data communications capabilities; a radiotelephone, a pager, an Internet/Intranet access, a Web browser, a memo pad, a calendar, and/or a PDA equipped with a Global Positioning System (GPS) receiver, and a common laptop and/or palm type receiver or some other electronic devices including a transmitter-receiver radiotelephone. The terminal may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal in a 5G network, a terminal in a future evolved PLMN or the like.

In some examples, the terminal 120 may perform Device to Device (D2D) communication.

In some examples, the 5G system or 5G network may also be called a New Radio (NR) system or an NR network.

A network device and two terminals are shown in FIG. 1 as an example. In some examples, the communication system 100 may include multiple network devices and another number of terminals that may be included under coverage of each network device. There are no limits made thereto in the embodiments of the disclosure.

In some examples, the communication system 100 may also include another network entity such as a network controller and a mobility management entity. There are no limits made thereto in the embodiments of the disclosure.

It is to be understood that the device having the communication function in the network/system in the embodiments of the disclosure may be referred to as a communication device. With the communication system 100 shown in FIG. 1 as an example, the communication device may include the network device 110 and the terminal 120, both of which have the communication function. The network device 110 and the terminal 120 are the above-described specific devices and will not be elaborated herein. The communication device may further include other devices in the communication system 100, such as a network controller, a mobile management entity and other network entities. There are no limits made thereto in the embodiments of the disclosure.

It is to be understood that terms "system" and "network" in the disclosure may be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

For the ease of understanding on the technical solutions of the embodiments of the disclosure, related concepts involved in the embodiments of the disclosure will be described below.

The technical solutions in the embodiments of the disclosure are mainly applied to 5G mobile communication systems. Certainly, the technical solutions in the embodiments of the disclosure are not limited to the 5G mobile communication systems, and may also be applied to other types of mobile communication systems. Main application scenarios of the 5G mobile communication technologies include: Enhance Mobile Broadband (eMBB), Ultra Reliable Low Latency Communication (URLLC) and massive Machine Type Communication (mMTC). Descriptions are made below to the main application scenarios in the 5G mobile communication systems.

1) eMBB scenario: the eMBB aims to make users obtain multimedia contents, services and data, with the service requirement increasing very rapidly. As the eMBB may be deployed in different scenarios such as rooms, urban areas and rural areas, there is a big difference in service capability and requirement, and the services must be analyzed in combination with specific deployment scenarios.

2) URLLC scenario: the URLLC is typically applied to industrial automation, power automation, remote medical operation, traffic safety guarantee and the like.

3) mMTC scenario: typical features of the URLLC include a high connection density, a small data size, a delay insensitive service, a low cost and long service life of modules, and the like.

In 5G network environments, a novel RRC state, i.e., an RRC inactive (RRC_INACTIVE) state, is defined for reducing radio signaling, quickly resuming wireless connections and quickly restoring data services. Such a state is different from an RRC idle (RRC_IDLE) state and an RRC connected (RRC_CONNECTED) state.

The three RRC states in the 5G network environments will be described below.

1) RRC_IDLE state: mobility is based on cell selection and reselection of UE, paging is initiated by a Core Network (CN), and a paging region is configured by the CN. The base station is provided with neither a UE Access Stratum (AS) context nor a RRC connection.

2) RRC_CONNECTED state: there is a RRC connection as well as a UE AS context of a base station and UE. The network side knows which cell the UE is residing in. The mobility is controlled by the network side. Unicast data may be transmitted between the UE and the base station.

3) RRC_INACTIVE state: mobility is based on cell selection and reselection of the UE, connection is provided between a CN and a RAN, a UE AS context is present on a base station, paging is triggered by a RAN, a paging region based on the RAN is managed by the RAN, and a network side knows the location of UE based on the paging region of the RAN.

Figure 2:
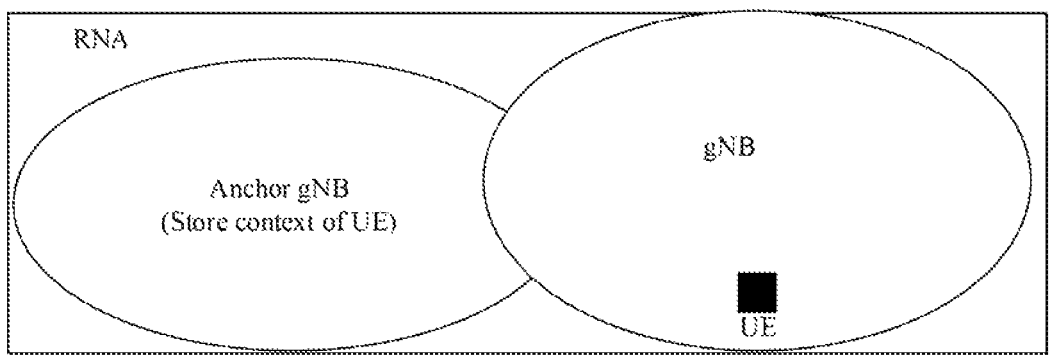
FIG. 2 is a schematic diagram of an RAN according to an embodiment of the disclosure.

When UE is in the RRC_INACTIVE state, a network side may configure a RAN paging region for the UE through dedicated signaling, and the RAN paging region may be one cell or multiple cells, as shown in FIG. 2. When the UE moves in the region, the network side is not needed to be notified. In this case, a mobility behavior in the idle state, i.e., a cell selection and reselection principle, is followed. When the UE moves out of the paging region configured by the RAN, the UE may be triggered to resume RRC connection and re-acquire the paging region configured by the RAN. When downlink data reaches the UE, the base station (such as a gNB) for keeping the connection between the RAN and a CN for the UE may trigger all cells in the RAN paging region to send a paging message to the UE, such that the UE in the INACTIVCE state can resume the RRC connection for data reception.

Hence, there are three cases that the UE enters the RRC connected state from the INACTIVCE state.

First, the UE has reached downlink data and the network side initiates paging to the RAN side, thereby promoting the UE to enter the connected state.

Second, the UE initiates updating of region of a RAN location, for example, periodically updating the RAN location or updating the position in a cross-region mode.

Third, the UE has uplink data to be transmitted to cause the UE to enter the connected state.

Figure 3:
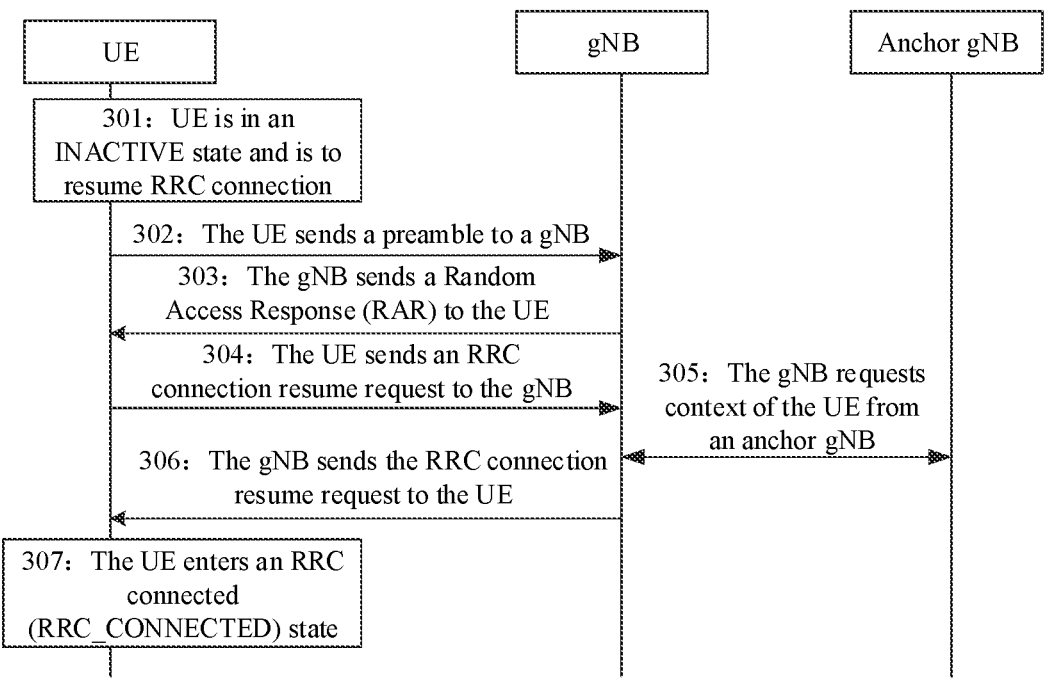
FIG. 3 is a schematic diagram of an RRC connection resuming process according to an embodiment of the disclosure.

FIG. 3 is a schematic diagram of an RRC connection resuming process. As shown in FIG. 3, the RRC connection resuming process may include the following operations.

At operation 301: UE is in an INACTIVE state and is to resume RRC connection.

At operation 302: the UE sends a preamble to a gNB.

At operation 303: the gNB sends a Random Access Response (RAR) to the UE.

At operation 304: the UE sends an RRC connection resume request to the gNB.

At operation 305: the gNB requests context information of the UE from an anchor gNB.

At operation 306: the gNB sends the RRC connection resume request to the UE.

At operation 307: the UE enters an RRC connected (RRC_CONNECTED) state.

In order to reduce the power consumption of a terminal and prolong the standby time of the terminal, an eDRX concept is introduced to the Release 13. A DRX cycle in the idle state is less than one System Frame Number (SFN), i.e., 10.24 s. However, in order to save the power of the terminal, a longer DRX cycle is introduced. The DRX cycle in the idle state exceeds 10.24 s, and is 43.69 min at maximum. In order to support such a DRX configuration, there is a need for introduction of a Hyper-SFN (H-SFN) concept.

Figure 4:
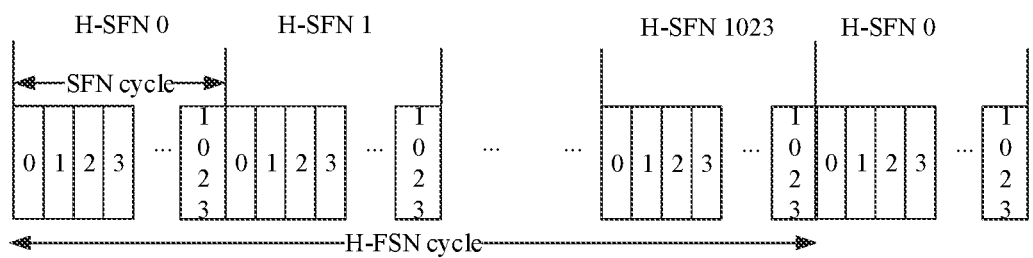
FIG. 4 is a schematic diagram of a Hyper-System Frame Number (H-SFN) according to an embodiment of the disclosure.

Referring to FIG. 4, one SFN is 10 ms, and the SFN ranges from 0 to 1023. When reaching 1023, the SFN restarts from 0, i.e., 1024 SFNs form one SFN cycle. With the introduction of the H-SFN concept, 1024 SFNs form one H-SFN, and one H-SFN is 10240 ms=10.24 s. Likewise, the H-SFN ranges from 0 to 1023. When reaching 1023, the H-SFN restarts from 0, and 1024 H-SFNs form one H-SFN cycle.

With the introduction of the eDRX, the occasion that the UE reads paging is represented by (PH, PF, PO). The PH is Paging Hyperframe and represents a hyperframe number at which the paging is located, the PF is Paging Frame and represents a system frame number at which the paging is located, and the PO is Paging Occasion and represents a subframe number at which the paging is located. The (PH, PF, PO) may also be represented as (PH, PTW (PF, PO)). The PTW is Paging Time Window. Hence, there is a need for determination of a hyperframe number (H-SFN) at which the paging is located and the start system frame number (SFN) of the PTW. Further, the H-SFN and the SFN may be determined through the following formulas:

$$\text{H-SFN mod TeDRX}=(\text{UE\_ID mod TeDRX}), \text{ where,}$$
$$\text{UE\_ID}=\text{IMSI mod 1024; and}$$

$$\text{SFN}=(1024/K)*\text{ieDRX, where, ieDRX}=\text{floor(UE\_ID/TeDRX)mod } K, \text{ TeDRX}=\text{UE eDRX cycle, } K=4.$$

Figure 5:
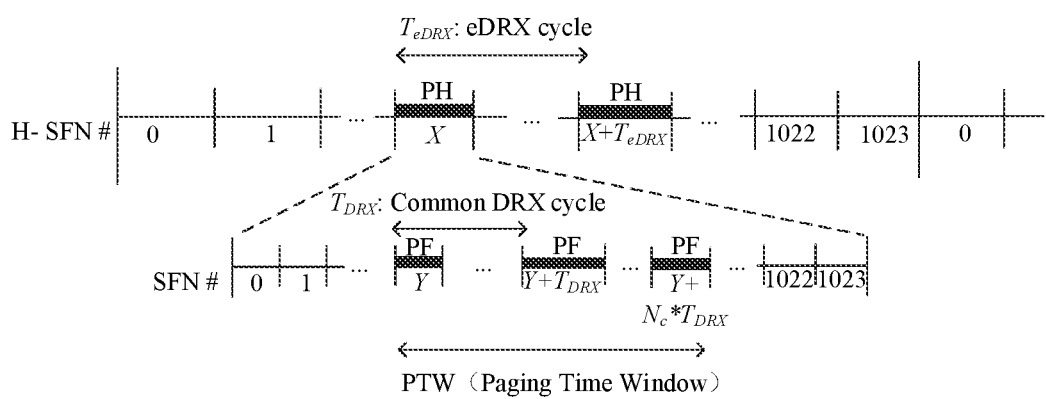
FIG. 5 is a schematic diagram of a Paging Time Window (PTW) according to an embodiment of the disclosure.

The PF/PO in the PTW may be calculated according to the conventional PF/PO calculation formula and a cell default DRX, which may be referred to FIG. 5.

FIG. 6 is a flowchart of a method for determining a configuration parameter according to an embodiment of the disclosure. As shown in FIG. 6, the method for determining the configuration method may include the following operations.

At 601: a terminal determines, after entering from an inactive state to an idle state, to use a first extended Discontinuous Reception (eDRX) configuration parameter or a second eDRX configuration parameter to control a monitoring state of the terminal, the first eDRX configuration parameter being an eDRX configuration parameter corresponding to the inactive state, and the second eDRX configuration parameter being an eDRX configuration parameter corresponding to the idle state.

In the embodiment of the disclosure, the terminal may be any device capable of communicating with a network device such as a mobile phone, a tablet computer, a notebook computer and a desktop computer.

In the embodiment of the disclosure, the connected state is the RRC_CONNECTED state in the above solutions, and the inactive state is the RRC_INACTIVE state in the above solutions.

In the embodiment of the disclosure, the terminal may include two eDRX configuration parameters that are respectively the first eDRX configuration parameter and the second eDRX configuration parameter. The first eDRX configuration parameter is the eDRX configuration parameter corresponding to the inactive state, and the second eDRX configuration parameter is the eDRX configuration parameter corresponding to the idle state. It is to be noted that the eDRX configuration parameter is configured to control the monitoring state of the terminal. Specifically, the monitoring state of the terminal may be to monitor a downlink channel or downlink signal, or not to monitor a downlink channel or downlink signal. The eDRX configuration parameter is configured to determine a paging occasion (PH, PF, PO), including an eDRX cycle and various timers. Examples of the timers include: a edrx-Inactivity Timer configured to monitor a downlink Physical Downlink Control Channel (PDCCH) upon the reception of uplink newly-uploaded data or downlink newly-uploaded data; a edrx-Retransmission Timer configured to start a retransmission timer in a case where data is not correctly received after Hybrid Auto Retransmission Quest (HARQ) Round Trip Time (RTT), so as to monitor a PDCCH within the timer and receive retransmission data; a edrxShortCycleTimer, which is a timer with a short cycle, has N times of short cycle and is typically configured to determine whether a PDCCH is received in the short cycle timer, and enables the UE to enter a long cycle eDRX stage if no PDCCH is received. edrxStartOffset is a position where the eDRX starts and is described with a subframe. onDurationTimer is to used to set time for monitoring a PDCCH within the eDRX cycle.

In the embodiment of the disclosure, there are two cases that the terminal enters from the inactive state to the idle state.

First case: the terminal enters from the inactive state to the idle state based on first indication information of a network side, the first indication information indicating the terminal enters the idle state.

Such a case is that the terminal enters from the inactive state to the idle state under the control of the network side.

For example, the terminal may receive an RRC connection release message from the network side, the RRC connection release message carrying the first indication information, and the terminal enters from the inactive state to the idle state.

In a case where the terminal enters from the inactive state to the idle state based on the first indication information of the network side, the terminal may use the second eDRX configuration parameter to control the monitoring state of the terminal. In some examples, the terminal may delete the first eDRX configuration parameter.

Second case: the terminal enters from the inactive state to the idle state when determining that a first event occurs.

Such a case is that the terminal independently enters from the inactive state to the idle state without the control of the network side. The premise that the terminal independently enters from the inactive state to the idle state is that the first event is triggered, the first event including at least one of the followings:

reception of an initial paging message of a CN;

timeout of a first timer, the first timer being started when an RRC resume request is initiated;

failure of verification on Message 4 (MSG4) integrity protection;

cell reselection to a target Radio Access Type (RAT); and entering a state of residing in any cell.

In the above solutions, the first timer may be, for example, a T319 timer during the RRC resuming process.

In the above solutions, the target RAT refers to another RAT other than the RAT presently selected by the terminal.

In a case where the terminal enters from the inactive state to the idle state when determining that the first event occurs, the specifically used eDRX configuration parameter may be determined in the following modes.

First mode: the terminal uses the second eDRX configuration parameter to control the monitoring state of the terminal.

Herein, the terminal may intermediately use the second eDRX configuration parameter to control the monitoring state of the terminal after entering from the inactive state to the idle state.

Second mode: the terminal continuously uses the first eDRX configuration parameter to control the monitoring state of the terminal.

Herein, the terminal may continuously use the first eDRX configuration parameter to control the monitoring state of the terminal after entering from the inactive state to the idle state.

Further, the terminal may continuously use the first eDRX configuration parameter to control the monitoring state of the terminal, which may be implemented in one of the following modes.

1) After the terminal enters from the inactive state to the idle state, the first timer may be started, and the terminal may continuously use the first eDRX configuration parameter to control the monitoring state of the terminal; and when the first timer times out, the first eDRX configuration parameter stops to be used, and the second eDRX configuration parameter is used to control the monitoring state of the terminal, a duration of the first timer being configured by the network side or specified by a protocol.

For example, when the terminal enters from the inactive state to the idle state, the first timer is started. In the duration of the first timer, the terminal may continuously use the first eDRX configuration parameter to control the monitoring state of the terminal; and when the first timer times out, the first eDRX configuration parameter stops to be used, and the second eDRX configuration parameter is used to control the monitoring state of the terminal.

2) The terminal may continuously use the first eDRX configuration parameter to control the monitoring state of the terminal till the terminal enters a connected state, and the terminal may delete the first eDRX configuration parameter after entering the connected state.

Third mode: the terminal determines, based on a first cause value, whether to use the second eDRX configuration parameter or continuously use the first eDRX configuration parameter to control the monitoring state of the terminal, the first cause value being determined based on the first event.

Herein, the first cause value refers to a trigger cause value for triggering the terminal to enter from the inactive state to the idle state. There is a first corresponding relationship between the first cause value and the first even. For example, 000 represents that the initial paging message of the CN is received; 001 represents that the first timer times out, the first timer being started when the RRC resume request is initiated; the 010 represents that the verification on the MSG4 integrity protection is failed; the 011 represents that the cell is reselected to the target RAT; and the 100 represents that the state of residing in any cell comes. The first corresponding relationship may be configured by the network side or specified by a protocol.

In view of this, the terminal may determine, based on the first corresponding relationship, whether the first cause value corresponds to the second eDRX configuration parameter or corresponds to the first eDRX configuration parameter. When the first cause value corresponds to the second eDRX configuration parameter, the terminal uses the second eDRX configuration parameter to control the monitoring state of the terminal. When the first cause value corresponds to the first eDRX configuration parameter, the terminal continuously uses the first eDRX configuration parameter to control the monitoring state of the terminal.

Further, after the terminal enters from the inactive state to the idle state, the first timer is started, and the terminal may continuously use the first eDRX configuration parameter to control the monitoring state of the terminal. When the first timer times out, the first eDRX configuration parameter stops to be used, and the second eDRX configuration parameter is used to control the monitoring state of the terminal, a duration of the first timer being configured by the network side or specified by a protocol.

Or, the terminal continuously may use the first eDRX configuration parameter to control the monitoring state of the terminal till the terminal enters a connected state, and the terminal may delete the first eDRX configuration parameter after entering the connected state.

Figure 7:
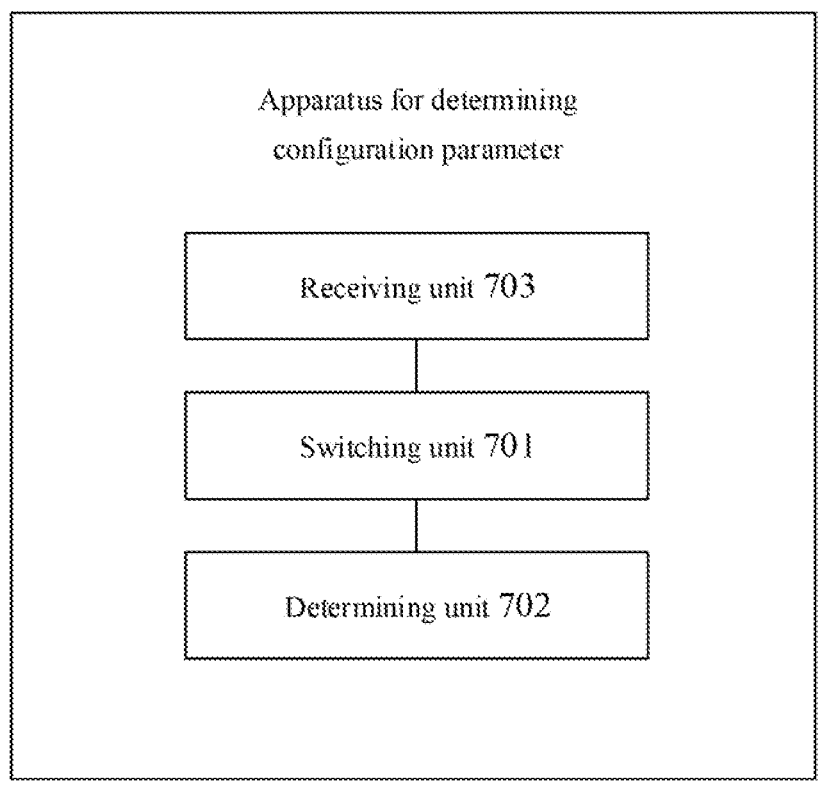
FIG. 7 is a schematic structural diagram of an apparatus for determining a configuration parameter according to an embodiment of the disclosure.

FIG. 7 is a schematic structural diagram of an apparatus for determining a configuration parameter according to an embodiment of the disclosure. As shown in FIG. 7, the apparatus may include: a switching unit 701 and a determining unit 702.

The switching unit 701 is configured to control a terminal to enter from an inactive state to an idle state.

The determining unit 702 is configured to determine to use a first extended Discontinuous Reception (eDRX) configuration parameter or a second eDRX configuration parameter to control a monitoring state of the terminal.

The first eDRX configuration parameter is an eDRX configuration parameter corresponding to the inactive state, and the second eDRX configuration parameter is an eDRX configuration parameter corresponding to the idle state.

In an implementation, the switching unit 701 is configured to:

control the terminal to enter from the inactive state to the idle state based on first indication information of a network side, the first indication information indicating the terminal enters the idle state.

In an implementation, the apparatus may further include: a receiving unit 703.

The receiving unit 703 is configured to receive an RRC connection release message from the network side, the RRC connection release message carrying the first indication information.

In an implementation, in a case where the switching unit 701 controls the terminal to enter from the inactive state to the idle state based on the first indication information of the network side, the determining unit 702 is configured to use the second eDRX configuration parameter to control the monitoring state of the terminal.

In an implementation, the switching unit 701 is configured to:

control the terminal to enter from the inactive state to the idle state when determining that a first event occurs.

In an implementation, the first event includes at least one of the followings:

reception of an initial paging message of a CN;
timeout of a first timer, the first timer being started when an RRC resume request is initiated;
failure of verification on MSG4 integrity protection;
cell reselection to a target RAT; and
entering a state of residing in any cell.

In an implementation, in a case where the switching unit 701 controls the terminal to enter from the inactive state to the idle state when determining that the first event occurs, the determining unit 702 is configured to use the second eDRX configuration parameter to control the monitoring state of the terminal.

In an implementation, in a case where the switching unit 701 controls the terminal to enter from the inactive state to the idle state when determining that the first event occurs, the determining unit 702 is configured to continuously use the first eDRX configuration parameter to control the monitoring state of the terminal.

In an implementation, in a case where the switching unit 701 controls the terminal from the inactive state to the idle state when determining that the first event occurs, the determining unit 702 is configured to determine, based on a first cause value, whether to use the second eDRX configuration parameter or continuously use the first eDRX configuration parameter to control the monitoring state of the terminal, the first cause value being determined based on the first event.

In an implementation, the determining unit 702 is configured to:

determine, based on a first corresponding relationship, whether the first cause value corresponds to the second eDRX configuration parameter or corresponds to the first eDRX configuration parameter; and use the second eDRX configuration parameter to control the monitoring state of the terminal when the first cause value corresponds to the second eDRX configuration parameter; and continuously use the first eDRX configuration parameter to control the monitoring state of the terminal when the first cause value corresponds to the first eDRX configuration parameter.

The first corresponding relationship may be configured by a network side or specified by a protocol.

In an implementation, the operation that the first eDRX configuration parameter is continuously used to control the monitoring state of the terminal may include the following operations.

After the switching unit 701 controls the terminal to enter from the inactive state to the idle state, the first timer is started, and the determining unit 702 may continuously use the first eDRX configuration parameter to control the monitoring state of the terminal; and when the first timer times out, the determining unit 702 may stop using the first eDRX configuration parameter and use the second eDRX configuration parameter to control the monitoring state of the terminal, a duration of the first timer being configured by the network side or specified by a protocol.

Or, the determining unit 702 may continuously use the first eDRX configuration parameter to control the monitoring state of the terminal till the terminal enters a connected state, the terminal deleting the first eDRX configuration parameter after entering the connected state.

It is to be understood by the person skilled in the art that related descriptions on the above apparatus for determining a configuration parameter in the embodiments of the disclosure may be understood with reference to the related descriptions on the method for determining a configuration parameter in the embodiments of the disclosure.

Figure 8:
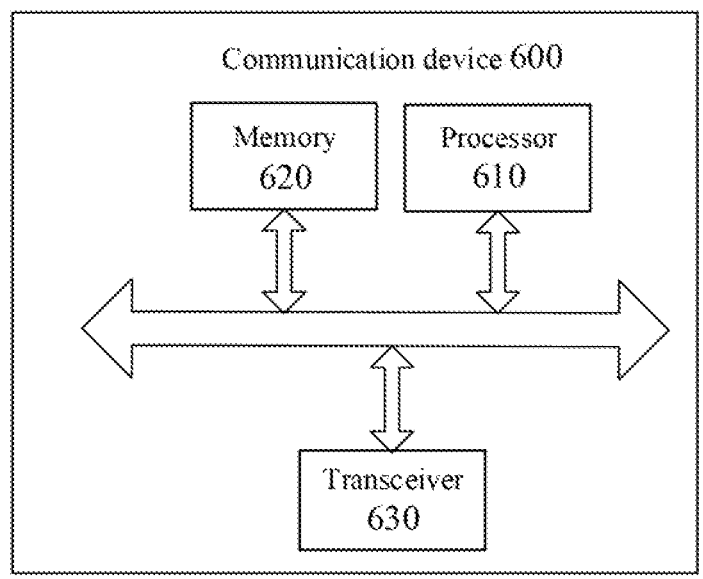
FIG. 8 is a schematic structural diagram of a communication device according to an embodiment of the disclosure.

FIG. 8 is a schematic structural diagram of a communication device 600 according to an embodiment of the disclosure. The communication device may be a terminal of any type. The communication device 600 shown in FIG. 8 includes a processor 610. The processor 610 may call a computer program from memory and run the computer program, to implement the method in the embodiments of the disclosure.

In some examples, as shown in FIG. 8, the communication device 600 may further include the memory 620. The processor 610 may call the computer program from the memory 620 and run the computer program, to implement the method in the embodiments of the disclosure.

The memory 620 may be a separate device independent of the processor 610, and may also be integrated in the processor 610.

In some examples, as shown in FIG. 8, the communication device 600 may further include a transceiver 630, and the processor 610 may control the transceiver 630 to communicate with another device, specifically sending information or data to the other device or receiving information or data sent by the other device.

The transceiver 630 may include a transmitter and a receiver. The transceiver 630 may further include an antenna. There may be one or more antennas.

In some examples, the communication device 600 may be the network device of the embodiments of the disclosure. The communication device 600 may implement corresponding flows implemented by the network device in each method of the embodiments of the disclosure. For simplicity, elaborations are omitted herein.

In some examples, the communication device 600 may be the mobile terminal/terminal of the embodiments of the disclosure. The communication device 600 may implement corresponding flows implemented by the mobile terminal/terminal in each method of the embodiments of the disclosure. For simplicity, elaborations are omitted herein.

Figure 9:
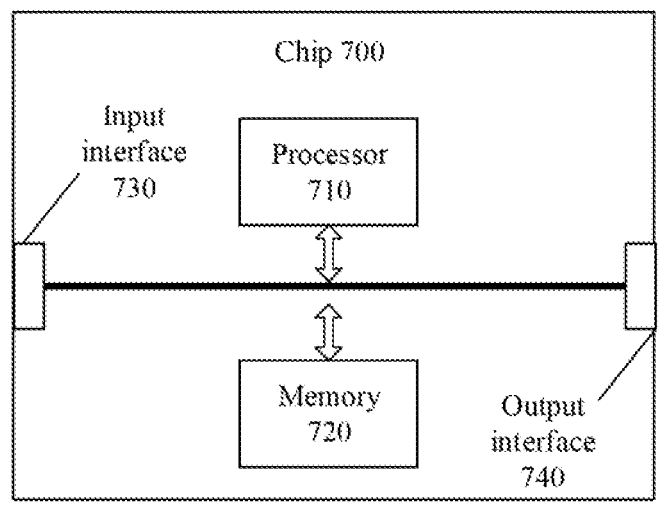
FIG. 9 is a schematic structural diagram of a chip according to an embodiment of the disclosure.

FIG. 9 is a schematic structural diagram of a chip according to an embodiment of the disclosure. The chip 700 shown in FIG. 9 includes a processor 710. The processor 710 may call a computer program from memory and run the computer program, to implement the method in the embodiments of the disclosure.

In some examples, as shown in FIG. 9, the chip 700 may further include the memory 720. The processor 710 may call the computer program from the memory 720 and run the computer program, to implement the method in the embodiments of the disclosure.

The memory 720 may be a separate device independent of the processor 710, and may also be integrated in the processor 710.

In some examples, the chip 700 may further include an input interface 730. The processor 710 may control the input interface 730 to communicate with another device or chip, specifically acquiring information or data sent by the other device or chip.

In some examples, the chip 700 may further include an output interface 740. The processor 710 may control the output interface 740 to communicate with another device or chip, specifically outputting information or data to the other device or chip.

In some examples, the chip may be applied to the network device in the embodiments of the disclosure, and the chip may implement corresponding flows implemented by the network device in each method of the embodiments of the disclosure. For simplicity, elaborations are omitted herein.

In some examples, the chip may be applied to the mobile terminal/terminal in the embodiments of the disclosure, and the chip may implement corresponding flows implemented by the mobile terminal/terminal in each method of the embodiments of the disclosure. For simplicity, elaborations are omitted herein.

It is to be understood that the chip mentioned in the embodiments of the disclosure may also be called a system-level chip, a system chip, a chip system or a system on chip, etc.

Figure 10:
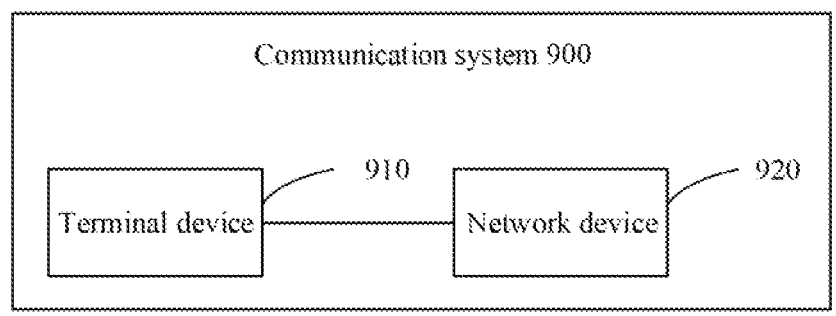
FIG. 10 is a schematic block diagram of a communication system according to an embodiment of the disclosure.

FIG. 10 is a schematic block diagram of a communication system 900 according to an embodiment of the disclosure. As shown in FIG. 10, the communication system 900 includes: a terminal 910 and a network device 920.

The terminal 910 may be configured to implement corresponding functions implemented by the terminal in the above method, and the network device 920 may be configured to implement corresponding functions implemented by the terminal device in the above method. For ease of briefness, details are not elaborated.

It is to be understood that the processor in the embodiments of the disclosure may be an integrated circuit chip and has a signal processing capability. In an implementation process, each operation of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or an Erasable PROM (EPROM) and a register. The storage medium is located in memory, and the processor reads information in the memory, and completes the operations of the methods in combination with hardware.

It is to be understood that the memory in the embodiments of the disclosure may be a volatile memory or a nonvolatile memory, or may include both the volatile and nonvolatile memories. The nonvolatile memory may be an ROM, a PROM, an EPROM, an Electrically EPROM (EEPROM) or a flash memory. The volatile memory may be an RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES- DRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the above memory is an example, but unlimitedly described. For example, the memory in an implementation may further be a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM) and a Direct Rambus RAM (DR RAM), etc. In other words, the memory described in an implementation includes but not limited to these and any other appropriate types of memories.

The embodiments of the disclosure also provide a computer-readable storage medium, which is configured to store a computer program.

In some examples, the computer-readable storage medium may be applied to the network device in the embodiments of the disclosure, and the computer program enables a computer to execute corresponding flows implemented by the network device in each method of the embodiments of the disclosure. For simplicity, elaborations are omitted herein.

In some examples, the computer-readable storage medium may be applied to a mobile terminal/terminal in the embodiments of the disclosure, and the computer program enables a computer to execute corresponding flows implemented by the mobile terminal/terminal in each method of the embodiments of the disclosure. For simplicity, elaborations are omitted herein.

The embodiments of the disclosure also provide a computer program product, which includes computer program instructions.

In some examples, the computer program product may be applied to the network device in the embodiments of the disclosure, and the computer program instructions enable a computer to execute corresponding flows implemented by the network device in each method of the embodiments of the disclosure. For simplicity, elaborations are omitted herein.

In some examples, the computer program product may be applied to a mobile terminal/terminal in the embodiments of the disclosure, and the computer program instructions enables the computer to execute corresponding flows implemented by the mobile terminal/terminal device in each method of the embodiments of the disclosure. For simplicity, elaborations are omitted herein.

The embodiments of the disclosure also provide a computer program.

In some examples, the computer program may be applied to the network device in the embodiments of the disclosure, and the computer program runs in a computer to enable the computer to execute corresponding flows implemented by the network device in each method of the embodiments of the disclosure. For simplicity, elaborations are omitted herein.

In some examples, the computer program may be applied to the mobile terminal/terminal in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another mode. For example, the device embodiment described above is only schematic, and for example, division of the units is only logic function division, and other division modes may be adopted during practical implementation. For example, multiple units or components may be combined or integrated into another system, or some characteristics may be neglected or not executed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disc.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subjected to the scope of protection of the claims.

The invention claimed is:

1. A method for determining a configuration parameter, comprising:

determining, by a terminal, to use a first extended Discontinuous Reception (eDRX) configuration parameter or a second eDRX configuration parameter to control a monitoring state of the terminal after the terminal enters from an inactive state to an idle state,
wherein the first eDRX configuration parameter is an eDRX configuration parameter corresponding to the inactive state, and the second eDRX configuration parameter is an eDRX configuration parameter corresponding to the idle state;
wherein the terminal entering from the inactive state to the idle state comprises:
the terminal enters from the inactive state to the idle state when determining that a first event occurs; and
wherein in a case where the terminal enters from the inactive state to the idle state when determining that the first event occurs, the terminal determines, based on a first cause value, whether to use the second eDRX configuration parameter or continuously use the first eDRX configuration parameter to control the monitoring state of the terminal, the first cause value being determined based on the first event.

2. The method of claim 1, wherein the first event comprises at least one of followings:
reception of an initial paging message of a Core Network (CN);
timeout of a first timer, the first timer being started when a Radio Resource Control (RRC) resume request is initiated;
failure of verification on Message 4 (MSG4) integrity protection;
cell reselection to a target Radio Access Type (RAT); and
entering a state of residing in any cell.

3. The method of claim 1, wherein determining, by the terminal, based on the first cause value, whether to use the second eDRX configuration parameter or continuously use the first eDRX configuration parameter comprises:
determining, by the terminal, whether the first cause value corresponds to the second eDRX configuration parameter or corresponds to the first eDRX configuration parameter based on a first corresponding relationship; and
using, by the terminal, the second eDRX configuration parameter to control the monitoring state of the terminal when the first cause value corresponds to the second eDRX configuration parameter; or continuously using, by the terminal, the first eDRX configuration parameter to control the monitoring state of the terminal when the first cause value corresponds to the first eDRX configuration parameter;
wherein the first corresponding relationship is configured by a network side or specified by a protocol.

4. The method of claim 1, wherein continuously using, by the terminal, the first eDRX configuration parameter to control the monitoring state of the terminal comprises:
after the terminal enters from the inactive state to the idle state, starting a first timer and continuously using the first eDRX configuration parameter by the terminal to control the monitoring state of the terminal; and when the first timer times out, stopping using the first eDRX configuration parameter and using the second eDRX configuration parameter to control the monitoring state of the terminal, a duration of the first timer being configured by a network side or specified by a protocol; or,
continuously using, by the terminal, the first eDRX configuration parameter to control the monitoring state of the terminal till the terminal enters a connected state, wherein the terminal deletes the first eDRX configuration parameter after entering the connected state.

5. An apparatus for determining a configuration parameter, comprising:
a processor; and
memory, storing a computer program,
wherein the processor is configured to call and run the computer program stored in the memory to implement a method comprising:
controlling a terminal to enter from an inactive state to an idle state; and
determining to use a first extended Discontinuous Reception (eDRX) configuration parameter or a second eDRX configuration parameter to control a monitoring state of the terminal,
wherein the first eDRX configuration parameter is an eDRX configuration parameter corresponding to the inactive state, and the second eDRX configuration parameter is an eDRX configuration parameter corresponding to the idle state;
wherein the processor is configured to run the computer program stored in the memory to implement the method further comprising:
controlling the terminal to enter from the inactive state to the idle state when determining that a first event occurs; and
wherein in a case where the switching unit controls the terminal to enter from the inactive state to the idle state when determining that the first event occurs, the determining unit is configured to determine, based on a first cause value, whether to use the second eDRX configuration parameter or continuously use the first eDRX configuration parameter to control the monitoring state of the terminal, the first cause value being determined based on the first event.

6. The apparatus of claim 5, wherein the first event comprises at least one of followings:
reception of an initial paging message of a Core Network (CN);
timeout of a first timer, the first timer being started when a Radio Resource Control (RRC) resume request is initiated;
failure of verification on Message 4 (MSG4) integrity protection;
cell reselection to a target Radio Access Type (RAT); or
entering a state of residing in any cell.

7. The apparatus of claim 5, wherein the determining unit is configured to:
determine, based on a first corresponding relationship, whether the first cause value corresponds to the second eDRX configuration parameter or corresponds to the first eDRX configuration parameter; and
use the second eDRX configuration parameter to control the monitoring state of the terminal when the first cause value corresponds to the second eDRX configuration parameter; or
continuously use the first eDRX configuration parameter to control the monitoring state of the terminal when the first cause value corresponds to the first eDRX configuration parameter;
wherein the first corresponding relationship is configured by a network side or specified by a protocol.

8. The apparatus of claim 5, wherein the operation that the first eDRX configuration parameter is continuously used to control the monitoring state of the terminal comprises:

after the switching unit controls the terminal to enter from the inactive state to the idle state, the first timer is started and the determining unit is configured to continuously use the first eDRX configuration parameter to control the monitoring state of the terminal; and when the first timer times out, the determining unit is configured to stop using the first eDRX configuration parameter and use the second eDRX configuration parameter to control the monitoring state of the terminal, a duration of the first timer being configured by a network side or specified by a protocol; and the determining unit is configured to continuously use the first eDRX configuration parameter to control the monitoring state of the terminal till the terminal enters a connected state, wherein the terminal deletes the first eDRX configuration parameter after entering the connected state.

\* \* \* \* \*